(12) United States Patent
He

(10) Patent No.: US 6,330,429 B1
(45) Date of Patent: Dec. 11, 2001

(54) CHANNEL GROUPING SYSTEM AND METHOD FOR A WIRELESS COMMUNICATIONS SYSTEM

(75) Inventor: Allen He, Cedar Knolls, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/291,757

(22) Filed: Apr. 14, 1999

(51) Int. Cl.$^7$ .................................................. H04B 17/00
(52) U.S. Cl. ..................... 455/67.1; 455/134; 455/135; 455/464; 455/515; 455/452
(58) Field of Search .................... 455/67.1, 450, 455/452, 453, 561, 464, 509, 513, 515, 67.3, 550, 115, 113, 134, 135, 434

(56) References Cited

U.S. PATENT DOCUMENTS

| | | | |
|---|---|---|---|
| 5,559,866 | * | 9/1996 | O'Neill ................................. 379/60 |
| 5,708,969 | | 1/1998 | Kotzin et al. . |
| 5,839,075 | * | 11/1998 | Haartsen et al. ..................... 455/450 |
| 5,862,487 | * | 1/1999 | Fujii et al. ........................... 455/454 |
| 5,903,843 | * | 11/1998 | Suzuki et al. ........................ 455/452 |
| 5,926,762 | * | 7/2000 | Arpee et al. ......................... 455/447 |
| 6,006,113 | * | 12/1999 | Meredith ............................. 455/562 |
| 6,052,583 | * | 1/2001 | Bernardin ............................ 455/423 |
| 6,058,108 | * | 5/2000 | Raith et al. .......................... 370/337 |
| 6,073,014 | * | 6/2000 | Blanchard et al. .................. 455/428 |
| 6,081,717 | * | 6/2000 | Shah et al. ........................... 455/446 |
| 6,138,024 | * | 10/2000 | Evans et al. ......................... 455/452 |
| 6,167,260 | * | 12/2000 | Azam et al. ......................... 455/426 |
| 6,175,734 | * | 1/2001 | Desgagne et al. ................... 455/437 |
| 6,185,423 | * | 2/2001 | Brown et al. .......................... 55/434 |

FOREIGN PATENT DOCUMENTS

| | | |
|---|---|---|
| 0546720 | 6/1993 | (EP) . |
| 2292655 | 2/1996 | (GB) . |

OTHER PUBLICATIONS

Tetsuyoshi Takenaka et al. "All–Channel Concentric Allocation in Cellular Systems", Proceedings of the Int'l Conference on Communcations (ICC), US, New York, IEEE vol. 2/3, May 23, 1993, pp. 920–924.

Hiroshi Furukawa et al. "Self–Organized Reuse Partitioning, A Dynamic Channel Assignment Method in Cellular System", Proceedings of the Vehicular Technology Conference, US, New York, IEEE, vol. CONF. 43, May 18, 1993, pp. 524–527.

Tetsuyoshi Takenaka et al. "All–Channel Concentric Allocation in Cellular Systems", Proceedings of the Int'l Conference on Communications (ICC), US, New York, IEEE vol. 2/3, May 23, 1993, pp. 920–24.

Hiroshi Furukawa et al. "Self–Organized Reuse Partitioning, A Dynamic Channel Assignment Method in Cellular System", Proceedings of the Vehicular Technology Conference, US, New York, IEEE, vol. CONF. 43, May 18, 1993, pp. 524–27.

* cited by examiner

Primary Examiner—William Trost
Assistant Examiner—Congvan Tran

(57) ABSTRACT

Received channels are grouped into channel groups in which each channel group includes channel members with commensurate signal parameter values to enhance performance of a wireless communications system. A data processing system establishes boundaries of each channel group to achieve an approximately equivalent quality of service (e.g., blocking rate) for each channel group based on the probabilities of occurrence of measured signal parameter values.

21 Claims, 7 Drawing Sheets

| group | 1 | 2 | 3 | 4 | 5 | 6 | 7 | 8 | 9 | 10 |
|---|---|---|---|---|---|---|---|---|---|---|
| CDF | 0–10% | 11–20% | 21–30% | 31–40% | 41–50% | 51–60% | 61–70% | 71–80% | 81–90% | 91–100% |
| RSS Low | neg. inf. | −125.3 | −121.4 | −118.4 | −115.9 | −113.4 | −110.7 | −107.84 | −104.1 | −98.616 |
| RSS High | −125.3 | −121.4 | −118.4 | −115.9 | −113.4 | −110.7 | −107.8 | −104.1 | −98.616 | 0 |

*FIG. 5*

CHANNEL GROUPING SYSTEM AND METHOD FOR A WIRELESS COMMUNICATIONS SYSTEM

FIELD OF THE INVENTION

This invention relates to a channel grouping system and method for a wireless communications system.

BACKGROUND OF THE INVENTION

In a wireless communications system, an uplink channel between a remote station and a base station has a received signal parameter value (e.g., signal strength) that depends upon the location of the remote station relative to the base station. In a time-division multiplex communications system, multiple uplink channels may be used simultaneously. The dynamic range of a coverage area represents a range from a lowest received signal strength of one channel to a highest received signal strength of another channel. For example, the lowest received signal strength may be a result of a remote station located at a periphery of the coverage area in which a base station is centrally located. The coverage area may be defined in terms of a probability of providing an electromagnetic transmission of at least a target minimum signal strength between a base station and a remote station throughout a cell, or sector thereof.

In a time-division multiplex wireless system, a wide dynamic range within a coverage area may impede the ability of the base station to adjust downlink transmit power transmitted to remote stations. A group of channels may be organized in such a manner as to limit the channels to a constant downlink transmit power, regardless of an uplink signal strengths or locations of the remote stations in the coverage area. However, the inability to adjust downlink transmit power in a time-division multiplex communications system may reduce the traffic capacity of a wireless communications system. Thus, a need exists for enabling downlink power control in coverage areas with potentially wide dynamic ranges of received signal strengths to realize the full potential capacity of a wireless system.

In some applications, a wide dynamic range of signal strength creates stringent isolation requirements in base station receiver circuitry. For example, a receiver may group channels from different frequency groups for input into a common intermediate frequency circuit module. The common intermediate frequency circuit module requires a degree of isolation that generally increases as the dynamic range of received signal strengths within a coverage area increases. Adequate isolation within the module prevents a "loud" channel with a higher signal magnitude from overwhelming and interfering with a "quiet" channel with an appreciably lower signal magnitude. While radio frequency shielding may sometimes provide adequate radio frequency isolation between circuit components, maximum achievable circuit board density may be sacrificed to accommodate metallic forms for shielding. Further, radio frequency shielding may involve burdensome redesigns of the metallic forms and testing of circuit boards after each modification of a circuit board. Thus, a need exists for reducing the radio frequency isolation requirements for receiver circuitry of communication system applications.

SUMMARY OF THE INVENTION

In accordance with the invention, received channels are grouped into channel groups in which each channel group includes channel members with commensurate signal parameter values to enhance base station performance in a wireless communications system. Received signal parameter data (e.g., signal strengths) are measured at a measurement location for electromagnetic transmissions transmitted by remote stations distributed throughout a radio frequency coverage area. A data processing system determines a probabilities of occurrence for corresponding measured signal parameter values at the measurement location. The data processing system assigns a desired number of channel groups of communication channels for the remote stations. The data processing system establishes boundaries of each channel group to achieve an approximately equivalent quality of service for each channel group based on the probabilities and corresponding measured signal parameter values.

In one aspect of the invention, the reception circuitry of a base station is organized to track the organization of the channel groups such that radio frequency isolation requirements are reduced. In another aspect of the invention, a base station is configured with a power control scheme that controls downlink transmit power based upon the channel groups such that each channel group may have a different power level.

BRIEF DESCRIPTION OF THE DRAWINGS

FIG. 5 is an exemplary chart showing channel groups established based upon a cumulative probability density function of FIG. 4.

DETAILED DESCRIPTION

A system and method for grouping received channels in a wireless system organizes received channels into channel groups such that each channel group contains channel members having commensurate signal parameter values. The commensurate signal parameter values are preferably defined as ranges of signal parameter values. In the context of a time-division multiplex system, channel refers to a frequency channel, a time-slot channel, or a time-slot within a frequency channel. although the channel grouping system and method may be applied to any type of channel, the channel grouping system and method is particularly well-suited for grouping frequency channels of a time-division multiplex communications system.

Method for Grouping Channels

Measuring Signal Parameter Values

Figure 1:
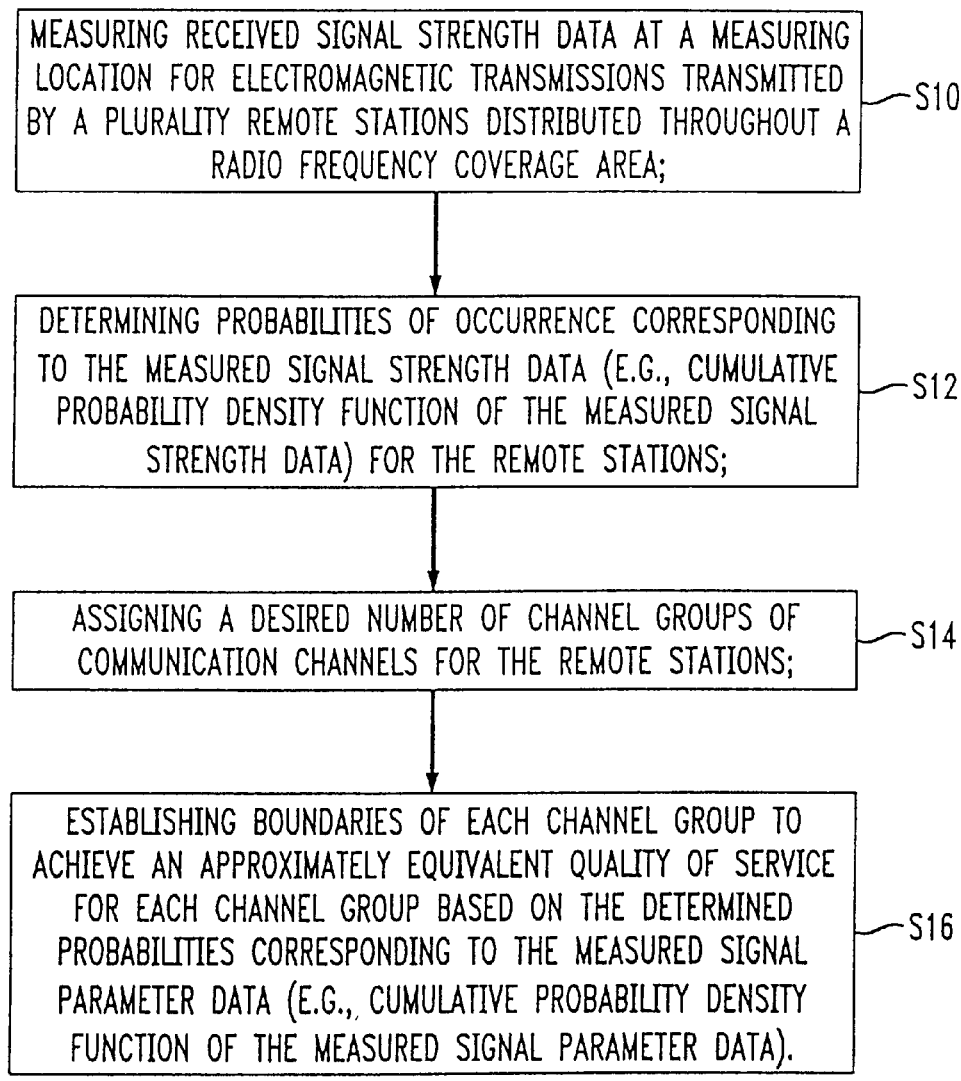
FIG. 1 is a flow chart illustrating a method of channel grouping in accordance with the invention.

FIG. 1 illustrates a method of grouping channels in accordance with the invention. Starting in step S10, a measurement device measures received signal parameter values (e.g., signal strengths) at a measurement location. For example, a measuring location may entail a centrally located base station site within a coverage area. The measurement device may, for example, comprise a received signal strength indicator integrated into a commercially available base station. The measurement device is coupled to a measurement recorder for recording the measured signal parameter values (e.g., signal strengths) and for organizing the received signal parameters into a database.

The received signal parameter values are associated with electromagnetic transmissions transmitted by remote stations distributed throughout a radio frequency coverage area. The radio frequency coverage area may be defined in terms of a probability of providing an electromagnetic transmission of at least a target minimum signal strength between a base station and a remote station throughout a cell, or sector thereof. Although the signal parameter values preferably comprise signal strength measurements, in alternate embodiments, the signal parameter values may include bit-error-rate measurements, frame-error-rate measurements, signal-to-interference measurements, signal-to-noise measurements, or another indicia of wireless system performance.

Figure 2:
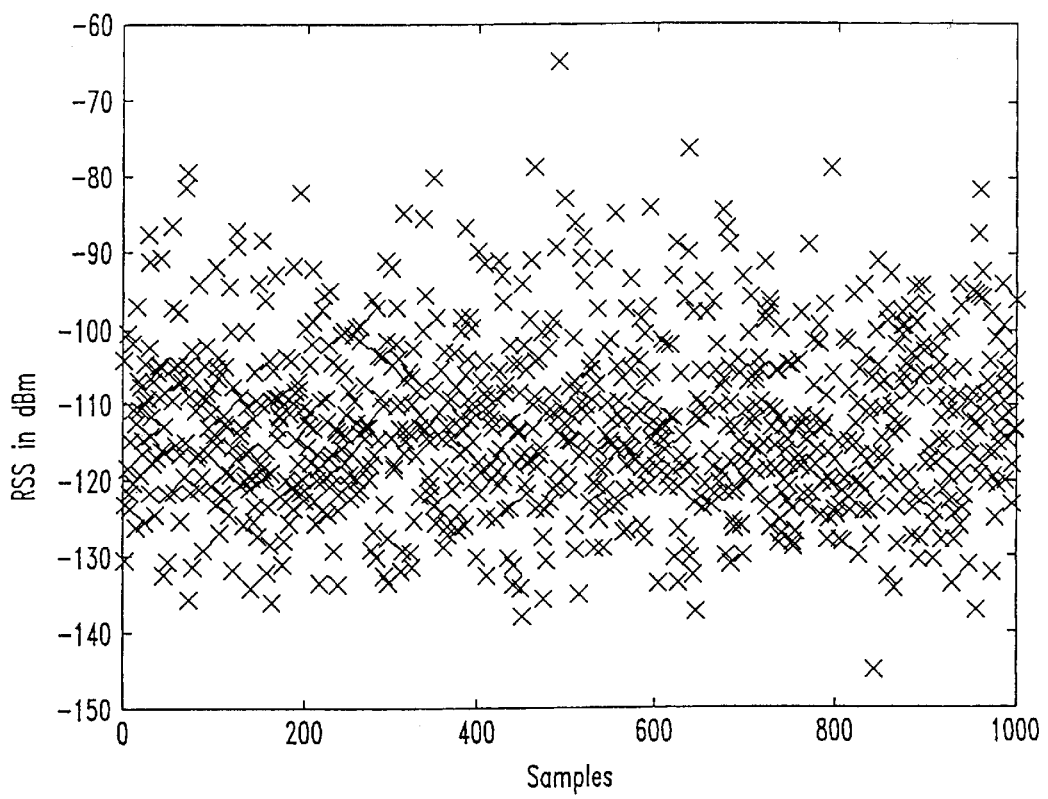
FIG. 2 is a scatter chart showing an example of received signal strength versus number of samples in a coverage area in accordance with the invention.

FIG. 2 represents an example of measuring received signal strength data as the signal parameter values according to step S10 in FIG. 1. A vertical axis of FIG. 2 indicates received signal strength measured in dBm at a measurement location or a base station site. A horizontal axis of FIG. 2 indicates the number of measurement samples of received signal strengths taken during a sampling period. Here, in FIG. 2 the sampling period was long enough to collect one thousand measurement samples.

Although the received signal strength (RSS) of each channel refers to an uplink received signal strength of an electromagnetic transmission from a remote station within the coverage area to a base station serving the coverage area, in an alternate embodiment the received signal strength may refer to a downlink received signal strength of an electromagnetic transmission from a base station to a remote station within the coverage area.

Additionally, a measuring procedure of step S10 may include collecting a sufficient number of measurement samples to establish a database of signal parameter values, remote station identifiers corresponding to the signal parameter values, and time-stamps corresponding to signal parameter values. The time-stamps would indicate the time of the electromagnetic transmission of the remote stations. Each received signal parameter value results from a measurement sample measured over a measuring duration for as long as necessary to provide a reliable indication of the signal parameter value. The number of measurement samples for a geographic coverage area must be taken over a sufficient sampling period to produce a statistically reliable indication of the actual distribution of active users in the geographic coverage area.

The sufficient duration for sampling equals or exceeds a time for gathering a minimum number of measurement samples necessary to attain a desired degree of statistical confidence. In practice, a sufficient duration for sampling typically represents a fixed time interval within a range from 10 minutes to several hours.

A statistically reliable indication is generally based on greater than or equal to approximately one-hundred measurement samples per coverage area; as the number of samples increases the statistical confidence of the estimated traffic pattern also increases to a limit. The estimated traffic pattern within each coverage area of a wireless system should become relatively stable once the minimum number of measurement samples is measured. In general, the larger the number of measurement samples, the more accurate the impression of the actual traffic pattern will be.

The received signal parameter values are periodically updated by taking new measurement samples to consider movement of remote stations throughout a geographic coverage area. Accordingly, measurement samples associated with a previous sampling period are superseded by measurement samples associated with a present or subsequent sampling period. Although any update time interval consistent with the above principles may be used to measure the signal parameters and to update the database, a typical update time interval is expected to fall within a range from ten minutes to eight hours.

Determining Cumulative Probability Density Function

Returning to FIG. 1, in step S12, the measured received signal parameter values of step S10 are provided to a processing system. The processing system may comprise, for example, a general purpose computer or an integral processing section of any infrastructure of the wireless system. The processing system communicates with the signal parameter measurer to facilitate measurement of a complete dynamic range of signal parameter values within a coverage area.

In general, the processing system determines probabilities of occurrence of corresponding measured signal parameter values within the complete dynamic range. For example, the processing system determines a cumulative probability density function of the measured signal parameter values for the remote stations based on the probability density function. The probability density function expresses the probability that a remote station will present a particular signal parameter value to the signal parameter measurer. The cumulative probability density function expresses a percentile-type indicia of probability of any signal parameter value received at the signal parameter measurer.

The cumulative probability density function may be determined in accordance with a two-step procedure. First, the processing system establishes a probability density function based on the measured signal parameter values. For example, the probability density function of FIG. 3 may be derived from a received signal strength distribution of FIG. 2 by using probability fractions. In this example, the total number of samples during a sampling period becomes a denominator of each probability fraction, whereas the number of occurrences of a particular received signal strength becomes the numerator of a particular probability fraction.

Figure 3:
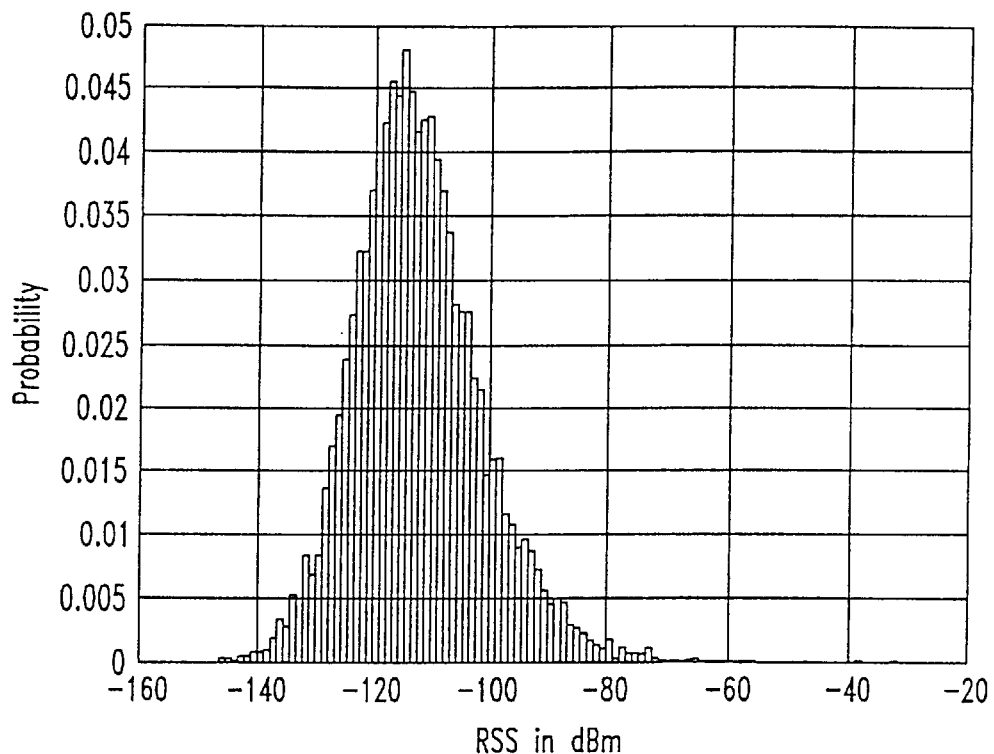
FIG. 3 is an exemplary graph illustrating a probability density function of received signal strength measured at a base station in accordance with the invention.

Accordingly, a vertical axis of FIG. 3 represents a probability, whereas the horizontal axis represents a received signal strength in dBm. Each bar in the probability density function represents a particular probability that a mobile station will provide a corresponding received signal strength to the measurement device at the measurement location.

Second, after determining the probability density function, various probabilities associated with corresponding received signal parameter values are summed based on their measured signal parameter values. The cumulative probability density function simply represents an arrangement of sums of probabilities derived from the probability density function. Within the cumulative probability density function, each sum covers all probabilities on the probability density function that correspond to received signal parameter values that fall below or equal to a particular received signal parameter value.

Figure 4:
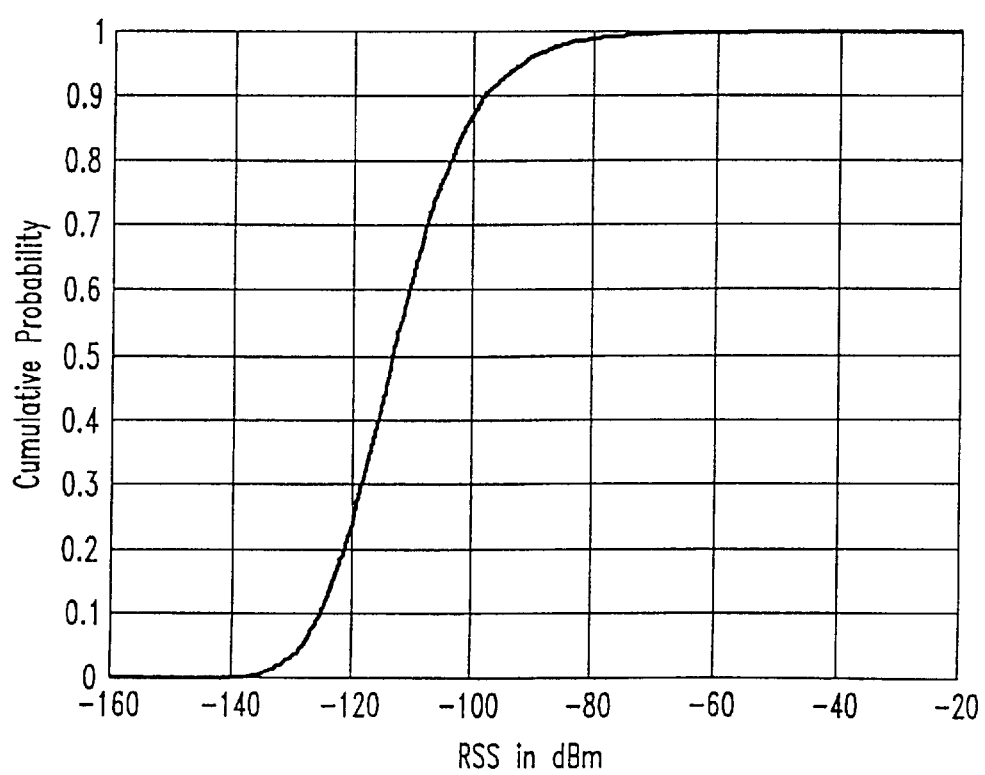
FIG. 4 is an exemplary graph of cumulative probability density function derived from the probability density function of FIG. 3.

FIG. 4 represents the cumulative probability density function generated from the probability density function of FIG. 3. The vertical axis of FIG. 4 represents cumulative probability and the horizontal axis represents signal strength in dBm. The cumulative probability represents a percentile for which an actual received signal strength is estimated to be less than or equal to a received signal strength corresponding to the percentile on the curve of FIG. 4. For example, a cumulative probability of 0.9 indicates that there is a ninety percent chance that the received signal strength is lower than or equal to −100 dBm. Because of statistical properties of the received signal strength, the cumulative density function (CDF) is always uniformly distributed to allow characterization as a curve, for any arbitrary probability density function (PDF).

Assigning Channel Groups

Once the cumulative probability density function is determined in step S12, the process continues with step S14. In step S14, the processing system assigns a desired number of channel groups of communication channels for the remote stations. Each channel group may be characterized by a range of signal parameter values, or by an average or median value of the signal parameter within the range.

The channel groups includes at least a first channel group associated with a first range of signal parameter values and a second channel group associated with a second range of signal parameter values distinct from the first range. The first range of signal parameter values and the second range of signal parameter values may bound each other and preferably represent mutually exclusive spans of signal parameter values. The first range and the second range are not restricted to covering equivalent span sizes or uniform intervals of signal parameter values.

The desired number of channel groups is generally specific to the application of the channel grouping method. In one example, the desired number of channel groups may depend upon a desired granularity of radio frequency power control and capacity limitations in a time-division multiplex communications system. As ranges of discrete power levels are made finer, a greater number of channel groups are required. Nevertheless, the desired number of channel groups must be consistent with the capacity limits of a base station, a base station receiver, a radio frequency reception system, or other applicable communications equipment.

The channel grouping method may be applied to a time-division multiplex system to facilitate radio frequency power control. The time-division multiplex system may include a plurality of bandwidths where each frequency bandwidth has time slots to accommodate a channel group of the grouping method. Accordingly, in a typical time-division multiplex application, the number of the channel groups would be limited to the number of different frequency bandwidths per geographic coverage area (e.g., cell).

The channel groups may be applied to a base station receiver to reduce radio frequency isolation requirements between circuits in multiple-bandwidth receivers (e.g., wide-band receiver). For example, a multiple-bandwidth receiver may include multiple receive frequency bandwidths that are processed at a common intermediate frequency with common intermediate frequency modules. The number of channel groups in such a case is proportional to the number of common intermediate frequency modules present.

Establishing Channel Group Boundaries

Finally, in step S16, the processing system establishes boundaries of each channel group to achieve an approximately equivalent quality of service for each channel group based on the probabilities of occurrence of corresponding signal parameter values for the remote stations. The relationship between the probabilities of occurrence and the corresponding signal parameter values are readily characterized as a cumulative probability density function. The boundaries are preferably established to achieve an approximately equal number of channels per channel group. The quality of service may comprise a grade of service, a blocking rate, or any other measure of system performance with respect to accessing a communications channel.

A graph or database of a cumulative probability density function may be used to establish the boundaries. Uniform intervals of cumulative probability are established by taking the total probability and dividing by the number of desired channel groups. in general, if the total probability of one is divided by N desired channel groups, N equal intervals result, wherein each interval has a cumulative probability span of one-Nth (i.e. 1/N) of the total probability. The limits of each interval of cumulative probability are associated with corresponding boundaries of signal parameter values according to the cumulative density function.

FIG. 5 shows a chart representing an illustrative result associated with completing step S14 and step S16 of FIG. 1. FIG. 5 shows that the total channels belonging to a base station may be divided into a number of groups, such that channels in the same group will have similar received signal strengths. Here, for illustrative purposes the channels are divided into ten desired channel groups, although virtually any number of channel groups may be used to practice the invention. The channels are partitioned into channel groups by using the cumulative probability density function of received signal strength, as best represented in FIG. 4.

In this example, the ten desired groups correspond to ten partitions of the cumulative probability density function. Each partition represents a range of received signal strength values that corresponds to an interval of cumulative probability, with an interval size proportional to the number of desired channel groups. The number of desired channel groups preferably matches the number of physical channel groups serving a coverage area (e.g., cell or sector) of the wireless communications system. The interval size of each group is estimated to serve a uniform percentage of the remote stations served by all channel groups collectively. The maximum number of channels per channel group may be limited by the available radio frequency hardware resources or the available RF spectrum of one or more base stations serving a geographic coverage area.

In FIG. 5, a left-most column provides labels for each row. A first row includes channel group identifiers, ranging from 1 to 10. A second row contains cumulative density function intervals. Each cumulative density function interval represents a percentile range of uniform width. For example, in the third column a cumulative density function interval ranges from an eleventh percentile to a twentieth percentile.

A third and a fourth row show the lower boundary and upper boundary, respectively, of each group. The lower boundary is related to a first limit of a probability interval of a cumulative probability density function. The upper boundary is related to a second limit of a probability interval of a cumulative probability density function.

The chart of FIG. 5 provides an illustrative example of the resultant channel groups and associated boundaries for each channel group in accordance with the invention. Each group boundary may be defined by first establishing a probability interval, wherein each probability interval is bounded by two values of cumulative probability on the vertical axis of FIG. 4. The group boundaries are represented by the two values of received signal strength on the curve of FIG. 4 that correspond to the two cumulative probabilities. In the example of FIG. 5, a first group has a boundary which covers any received signal strength whose value is less than −125.3 dBm. A tenth group has a boundary which covers any received signal strength whose value is greater than −98.6 dBm. The group size of any group interval signifies a difference between a lower boundary and an upper boundary of the group interval. For received signal strength, the group size may be measured in dBm.

The group intervals may be non-uniform in received signal strength value ranges in order to provide a suitable quality of service or grade of service across various different channel groups. Thus, one group interval may be larger or smaller than another group interval so that a mobile station within the geographic coverage area has an equal probability of accessing any channel group, assuming a valid cumulative probability density function and a uniform blocking rate prior to the implementation of the channel grouping method of the invention.

The channel groups are partitioned to attain a certain quality of service, such as a target blocking rate. Assuming a target blocking rate is satisfied by the underlying wireless system application of the channel grouping method, the subsequent application of the channel grouping method is configured to maintain the target blocking rate or to affect it uniformly. Appropriately selected boundaries enable the channels to provide approximately equal blocking rate for any mobile station's access to the wireless communications system. Accordingly, boundaries are preferably selected based on a historic or measured cumulative density function for a given geographic coverage area such that the active mobile stations are evenly distributed among the channel groups to an extent consistent with historic statistical behavior within the geographic coverage area.

Adaptive Updating of Allocated Channel Groups

After step S16, the channel groups may be adaptive (i.e. dynamically responsive) to changes in the dynamic range of received signal strength (RSS) as the measured signal parameters. Alterations in the dynamic range of the received signal strength may result from changes in the locations of users or the distribution of traffic within the wireless system. To update the allocation of channel groups based on the current dynamic range of the received signal strength, the base station continuously collects received signal strength data. The base station updates received signal strength data in an received signal strength database after either a fixed period or a fixed amount of new received signal strength data.

New data added to the database is used to replace or supersede analogous older data.

Updating older data involves updating measured received signal strengths of individual mobile stations to prepare an updated cumulative probability density function for a given geographic coverage area. The value of the measured received signal strength of each user is updated on a user-by-user basis, to replace a previously received signal strength with a more recently received signal strength. The processing system computes the most recent cumulative density function (CDF) from measurement samples of measured received signal strengths.

Present users are reassigned to the most recent allocation of channel groups based on the most recent cumulative probability density function and their most recent received signal strengths within the coverage area. As new users access the system, the new users are allocated to channel groups consistent with the most recent cumulative probability density function.

Group boundaries are adjusted to provide a suitable grade of service consistent with the number of desired channel groups and the most recent probability density function. When a new user is active within the geographic coverage area, the base station, the base station controller, or the processing system will assign it to a corresponding group according to its received signal strength. The foregoing method enables the system capacity to be allocated equitably among users regardless of which channel group serves any particular user because the allocation of channel groups are established based on a historic measure of use (i.e. cumulative probability density function) within a geographic coverage area.

Assigning Mobile Stations to Allocated Channel Groups

After channel groups and boundaries are established in accordance with FIG. 1, active mobile stations may be assigned to the allocated channel groups within each coverage area. To facilitate assigning the mobile stations to appropriate channel groups, further signal parameter measurements may be necessary over time.

In particular, the method may further include dynamically measuring signal parameters (e.g., signal strengths) of uplink transmit electromagnetic signals at any frequencies used by the wireless system within the coverage area. As users of mobile stations access the base station and engage in communications, at least one signal parameter measurer at an actively receiving base station takes real-time measurements of communication system parameters (e.g., received signal strengths) associated with the actively transmitting mobile stations. Each of the uplink transmit electromagnetic signals and its corresponding mobile station is dynamically classified into one of the channel groups based upon the measured signal parameter and the channel boundaries. Each mobile station is identifiable by a mobile station identifier. Each mobile station is assigned to a channel group so that its signal parameters during a measurement period fit within the signal parameter range defined by the particular channel group. The channel assignments of the mobile stations based on a previous measurement period are preferably updated during a present measurement period (or a subsequent measurement period) on a periodic basis sufficient to provide for accurate channel group assignments despite the movement of the mobile station throughout a geographic coverage area (e.g., cell), despite a hand-off to another geographic coverage area (e.g., an adjacent cell), or both.

A measurement period is equal to or greater than at least a minimum time required for obtaining one reliable measurement of a signal parameter by the signal parameter measurer. The signal parameter measurer at the base station periodically takes measurements such that over time any fluctuation in the signal parameter of the mobile stations is considered in allocating channel groups. Fluctuations in the signal parameter may be caused by normal movement of the mobile station throughout the geographic coverage area.

User Access to Channel Groups

Figure 6:
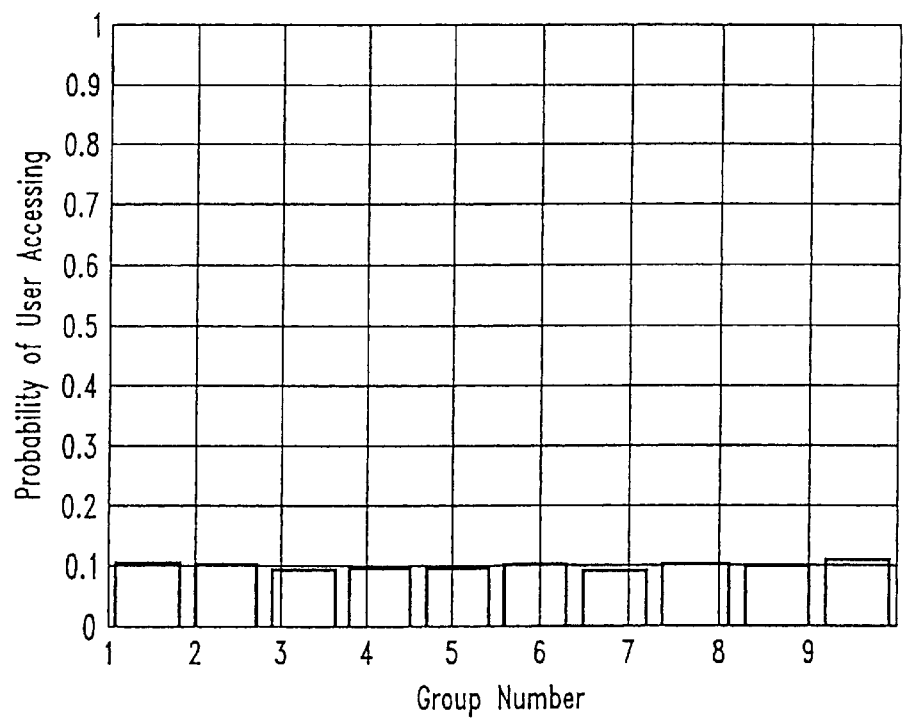
FIG. 6 is an exemplary graph indicating a users' probability of accessing any channel group served by a base station in accordance with the invention.

FIG. 6 represents a suitable quality of service for the remote (e.g., mobile) stations within a coverage area in accordance with step S16 of FIG. 1. Quality of service signifies a blocking rate, an access rate, or any other measure of system performance with respect to accessing a reliable communications channel via electromagnetic communication between a remote station and a base station serving a geographic coverage area.

A vertical axis represents a probability of a user of a remote station accessing the communication system. A horizontal axis represents the group numbers of ten illustrative channel groups, consistent with FIG. 5.

The channel grouping method of the invention partitions the received signal strength range such that the blocking rate of users in each channel group is approximately the same, assuming a valid cumulative probability density function and the blocking rate prior to the implementation of the channel grouping method is uniform. The blocking rate represents a probability in which one or more mobile stations requesting access to the communications system will be denied access because of insufficient traffic capacity of the communications system to meet the traffic demand. The blocking rate is usually measured as the ratio of unsuccessful attempts to access the system to the total number of attempts. For example, the blocking rate may be hardware-limited so that if all physical traffic channels serving a cell are in use, any additional users request access to the cell are blocked. A grade of service measures performance of the communications system in terms of a proportion of call attempts made during a peak usage time interval (e.g., busy hour) that fail.

The group boundaries are determined from a curve of cumulative density function of the received signal strength, such as the curve in FIG. 4. If the group boundary is determined based upon the curve of the cumulative density function of the received signal strength and if group intervals of received signal strength are appropriately selected, each channel group will have the same number of potential users. If the same number of channels are assigned to each channel group, the users in each and every channel group will have the same blocking rate.

FIG. 6 shows a probability for finding users in each group for users that conform to the received signal strength distribution of FIG. 2. The access rates of users are uniformly distributed in each group with roughly ten percent probability for being allocated to any one of the ten channel groups. Because approximately the same number of channels are assigned to each channel group, users in different channel groups will have the generally equivalent quality of service (e.g., blocking rate or grade of service) with respect to accessing the channel groups. FIG. 6 best illustrates that by grouping channels in accordance with the invention, equal access to the communications system is assured, where each group has an access probability determined by a fraction of one divided by the number of channel groups.

Application of the Channel Grouping Method to Time-Division Multiplex Communications In accordance with the invention, the grouping method may be applied to a time-division multiplex communications system (e.g., time-division multiple access). The time-division multiplex communications system includes one or more base stations per coverage area (e.g., cell) that support a group of different frequency bandwidths within the coverage area (e.g., cell). Each frequency bandwidth has a separately controllable downlink transmit power and includes multiple time-slots corresponding to traffic channels for mobile stations. The number of frequency bandwidths preferably equals the number of channel groups for the channel grouping method.

In the time-division multiplex (TDM) system, the channel grouping method partitions an entire spectrum of signal strengths among various acceptable ranges such that each range represents a group of commensurate signal strengths. A channel group of mobile stations is assigned to each range based on measured uplink signal strengths transmitted to the base station by the mobile stations. Commensurate signal strengths signifies that a difference between an upper limit and a lower limit of each range is minimal enough so power control can be exercised uniformly with respect to each range to keep radio frequency interference between mobile stations within acceptable margins and to promote maximum traffic capacity.

Figure 7:
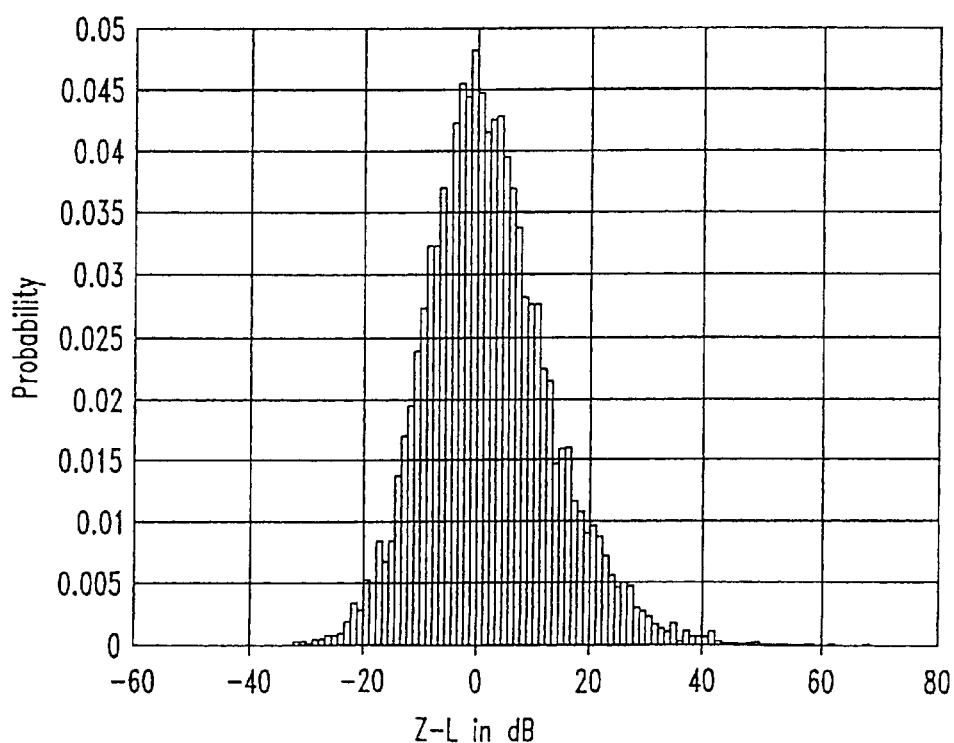
FIG. 7 is an exemplary graph illustrating a probability density function of signal-to-interference ratio before using the method of channel grouping in accordance with the invention.
Figure 8:
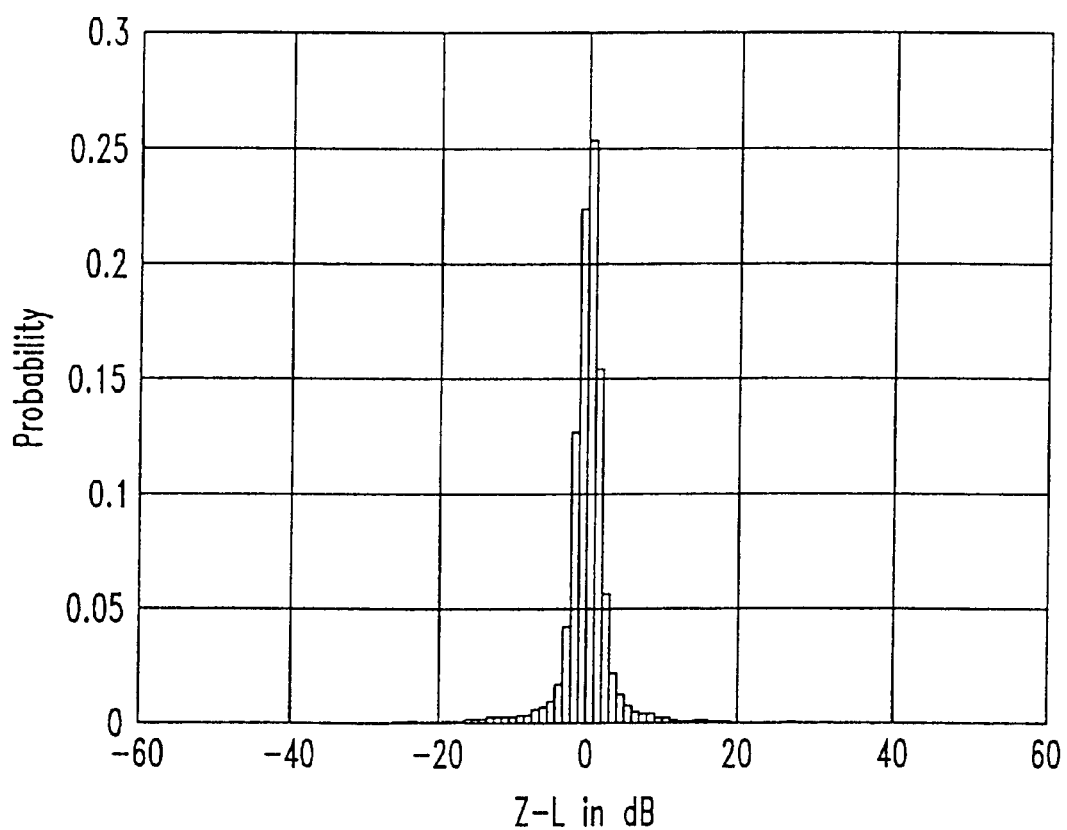
FIG. 8 is a graph illustrating a probability density function of signal-to-interference ratio after using the method of channel grouping in accordance with the invention.

FIG. 7 illustrates the dynamic range of signal-to-noise in a TDM wireless system prior to grouping channel groups in accordance with the method. In contrast, FIG. 8 illustrates the dynamic range in the signal-to-interference performance when grouping channel groups in accordance with the invention. An improvement in signal-to-interference ratio is best illustrated by comparing the change from FIG. 7 to FIG. 8. The vertical axes of FIG. 7 and FIG. 8 represent probability. The horizontal axes of FIG. 7 and FIG. 8 represent relative signal strength in dBm with respect to a median or mode value of signal strength. Thus, in the context of a time-division multiplex system, after channel grouping the signal-to-noise interference ratio falls over a narrower dynamic range per each frequency bandwidth to facilitate power control.

FIG. 8 presents a lesser dynamic range, between a highest level received signal strength and a lowest received signal strength within each channel group, than FIG. 7 does. As illustrated in FIG. 8, the dynamic range is reduced to a range of approximately 20 dB. Without doing channel grouping in accordance with the invention, the possible received signal strength may span more than 60 dB, as shown in FIG. 7.

Besides allowing power control in a time-division multiplex system, the grouping method facilitates interference reduction or greater circuit density within certain receiver configurations. In circuit design, interference reduction is often characterized in terms of radio frequency isolation required to achieve proper circuit performance in conformance with specifications. Potential impacts on the design include cost reduction of communications hardware or making a previously, physically impossible hardware implementation possible or practical.

Application of the Channel Grouping Method to a Receiver System

Grouping channels into channel groups in conformance with the principles of the invention, can reduce the radio frequency isolation requirements of hardware in base stations, or other wireless infrastructure. The grouping may be grouped such that channels groups are grouped to share common circuit modules (e.g., circuit boards) or common hardware with the closest interaction between any two channel groups having similar levels of signal strength to reduce radio frequency isolation requirements.

Figure 9:
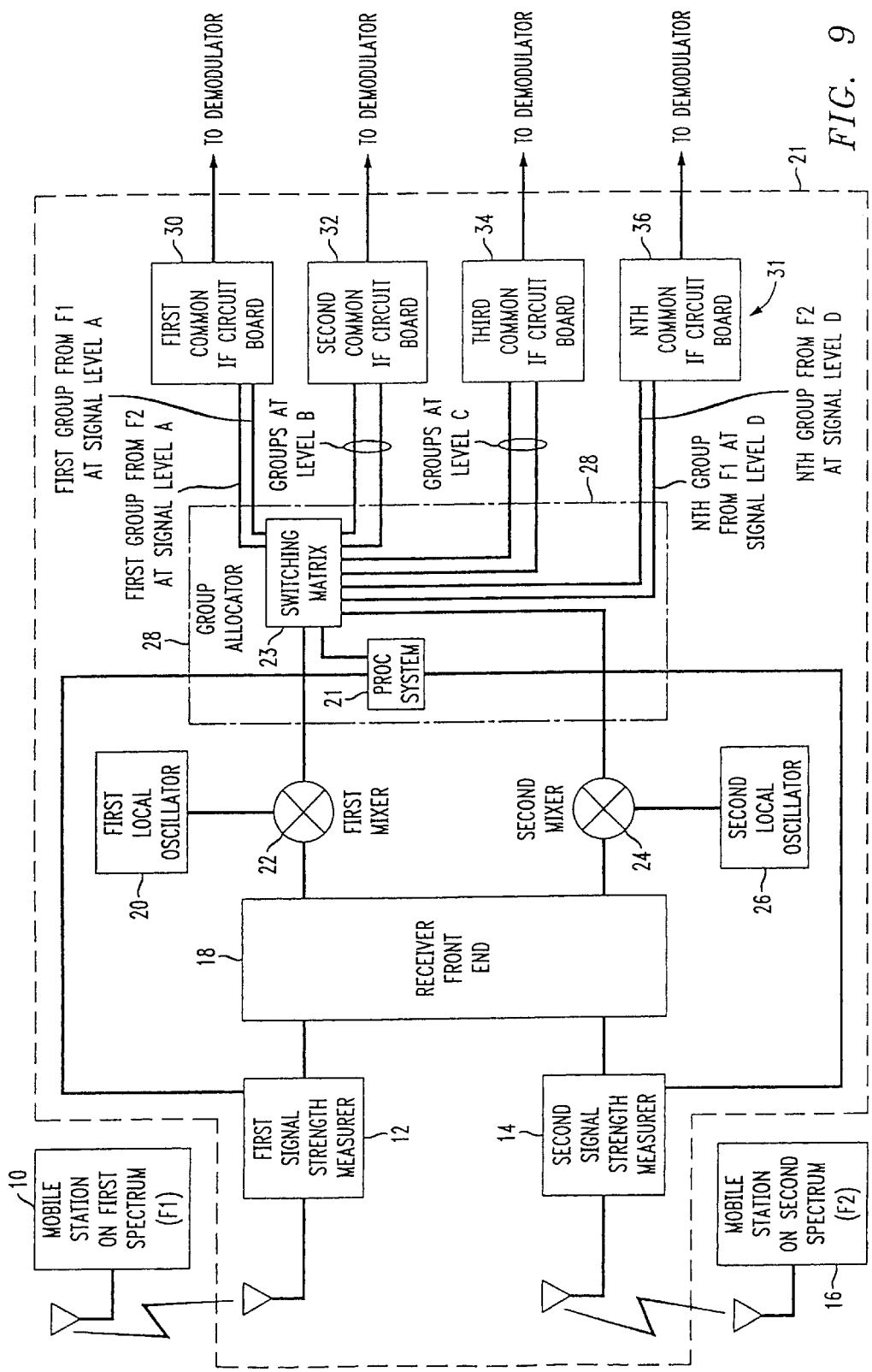
FIG. 9 is a receiver circuit illustrating an application of the method of the invention.

The channel grouping method may be applied to a receiver circuit of a base station, or another receiver, to reduce requirements for radio frequency isolation between hardware components. Accordingly, FIG. 9 illustrates a receiver system 21 using the channel grouping method of the present invention. The receiver system 21 is used after the channel group boundaries are established in manner consistent with the method of FIG. 1.

The receiver system 21 of FIG. 9 includes a first signal strength measurer 12 for receiving an electromagnetic transmission from a mobile station 10 on a first spectrum F1 and a second signal strength measurer 14 for receiving an electromagnetic transmission from a mobile station 16 on a second spectrum F2. The first and second signal strength measurers 12 and 14 are coupled to a receiver front-end 18. The receiver-front end is coupled to a first mixer 22 and a second mixer 24. A first local oscillator 20 and a second local oscillator 26 feed the first mixer 22 and the second mixer 24, respectively. The first mixer 22 and second mixer 24 are coupled to a group allocator 28. The first and second signal strength measurers 12 and 14 are coupled to the group allocator 28 to communicate signal strength measurements, or data derived therefrom, that form the basis for allocation of the channel groups in the group allocator 28. The group allocator 28 is coupled to common intermediate frequency boards 30, 32, 34, and 36 (generally designated as 31) in a manner that reduces radio frequency isolation requirements for the intermediate radio frequency boards.

The receiver front-end 18 has a sufficient bandwidth to cover a first frequency spectrum and a second frequency spectrum, different from the first frequency spectrum. The receiver front-end 18 provides a radio frequency signal as input to a first mixer 22 and a second mixer 24.

Outputs of the first mixer 22 and the second mixer 24 are arranged to fall within a common intermediate frequency range to facilitate the sharing of common intermediate circuit boards. The first local oscillator 20 and the second oscillator provide inputs to the first mixer 22 at a first frequency and to the second mixer 24 at a second frequency, respectively. The first frequency is preferably offset from the second frequency in accordance with the first frequency spectrum and the second frequency spectrum, respectively, to produce a common intermediate frequency.

The group allocator 28 decides which channel groups will share common intermediate frequency circuit boards based upon input signals from the first signal strength measurer 12 and the second signal strength measurer 14 and channel boundaries defined in accordance with the channel grouping method of the invention. Each frequency channel may be assigned dynamically to a channel group in accordance with its received measured signal strength at the first signal strength measurer 12 and at the second signal strength measurer 14.

The group allocator 28 may comprise a radio frequency switching matrix 23 controlled by a processing system 21 responsive to input signals from the first signal strength measurer 12, the second signal strength measurer 14. The processing system 21 may include memory or a storage medium for storing a look-up table containing information of the type shown in FIG. 6. The processing system is adapted to store at least the channel boundaries for each channel group in a database in terms of their signal parameter values (e.g., signal strengths).

Although FIG. 9 shows two channel groups per intermediate frequency circuit board 31, any number of channel groups per intermediate frequency may be used so long as the characteristic (e.g., average) signal strength of channel groups that share a common intermediate radio frequency board 31 are generally commensurate or not overly disparate. For example, if the average signal strengths of two groups exceeded 40 dB, the channel groups may be considered to have overly disparate signal strengths for purposes of the invention.

As illustrated in FIG. 9, a first common intermediate frequency circuit board 30 accepts inputs of one first group from a first frequency spectrum F1 at a first characteristic signal strength level and another first group from a second frequency spectrum F2 at the first characteristic signal level. Similarly, a second and third common intermediate frequency circuit boards 32, 34 accept inputs of one second group from a first frequency spectrum at a second characteristic signal strength level and another second group from a second frequency spectrum at a second characteristic signal level. Finally, an nth common intermediate frequency circuit board 36 accepts inputs of one nth group from a first frequency spectrum at another nth characteristic signal level and an nth group on a second frequency spectrum at an nth characteristic signal level. Each of the first groups has a commensurate characteristic signal parameter value (e.g., approximately equal signal strength) with respect to one another. Similarly, each of the second groups has a commensurate characteristic signal parameter value (e.g., approximately equal signal strength)with respect to one another. The common intermediate frequency boards are preferably coupled to a plurality of corresponding demodulators with sufficient radio frequency isolation from one another.

In practice, each common intermediate frequency circuit board 31 may have radio frequency shielding to shield it from other intermediate radio frequency circuit boards 31. The channel grouping method may allow a reduction or elimination of radio frequency shielding. Further, the channel grouping method potentially facilitates greater circuit board density by allowing sharing of common circuit boards (e.g., common intermediate frequency circuit boards) between multiple communication assemblies or communication systems.

In an alternate embodiment, a common intermediate frequency circuit board may include a first signal branch for carrying a first channel group of channels having a first range of commensurate signal strengths and a second signal branch for carrying a second channel group of channels having a second range of commensurate signal strengths. The first range and the second range of signal strengths fall within a tolerance level of one another such that the radio frequency isolation requirements between the first signal branch and the second signal branch are reduced.

As a first mobile station 10 on a first frequency spectrum F1 and a second mobile station 16 on a second frequency spectrum F2 transmit an electromagnetic uplink signal to the receiver system 21, the receiver system 21 determines a first signal strength for a received signal originating from the first mobile station 10 and a second signal strength for a received signal originating from the second mobile station 16. The receive front end amplifies, filters, or otherwise processes the received signals. The first mixer 22 and the first oscillator down-converts the first frequency spectrum to a common intermediate frequency range. The second mixer 24 and the second oscillator down-converts the second frequency spectrum to the common intermediate frequency range. The group allocator 28 allocates each received electromagnetic signal (e.g., pulse transmission) into an appropriate channel group based on the channel boundaries and the magnitude of the first signal strength or the second signal strength.

Accordingly, if the first signal strength and the second signal strength are sufficiently close in magnitude to fall within an equivalent channel group defined in accordance with a characteristic signal parameter value (e.g., signal strength range), the received signals associated with the first signal strength and the second signal strength may be allocated to channel groups in a manner such that they share a common intermediate frequency circuit board.

This specification describes various illustrative embodiments of the system and method of the present invention. The scope of the claims is intended to cover various modifications and equivalent arrangements of the illustrative embodiments disclosed in the. specification. Therefore, the following claims should be accorded the reasonable broadest interpretation to cover the modifications, equivalent structures, and features which are consistent with the spirit and the scope of the invention disclosed herein.

The following is claimed:

1. A method for defining channel groups in a wireless system, the method comprising:
   measuring received signal parameter values at a measurement location for electromagnetic transmissions transmitted by a plurality of remote stations distributed throughout a radio frequency coverage area in a wireless system;
   determining probabilities corresponding to measured signal parameter values for the remote stations;
   assigning a desired number of channel groups of communication channels for the remote stations; and
   establishing boundaries of each channel group to achieve an approximately equivalent quality of service for each channel group based on the probabilities corresponding to signal parameter values.

2. The method according to claim 1 wherein the measuring step includes collecting a sufficient number of measurement samples to establish a database of signal parameter measurements corresponding remote station identifiers, and corresponding time-stamps indicating the time of the electromagnet transmission.

3. The method according to claim 1 wherein the measuring step includes periodically updating the measured signal parameter data by taking new measurements.

4. The method according to claim 1 wherein the measuring step comprises measuring received signal parameter values at a base station, centrally located within the radio frequency coverage area, as the measurement location.

5. The method according to claim 1 wherein the determining step is accomplished by first establishing a probability density function based on the measured signal parameter data.

6. The method according to claim 5 wherein the determining step is accomplished by summing various probabilities associated with corresponding received signal parameter values in a probability density function based on the measured signal strength.

7. The method according to claim 1 further comprising the steps of:
   measuring signal parameters values, in real-time, associated with one or more uplink electromagnetic signals transmitted by the remote stations;
   classifying each of the uplink electromagnetic signals into one of said channel groups based upon the measured signal parameters values and the established boundaries such that each mobile station meets a particular range of measured signal parameter values defined by the established boundaries.

8. The method according to claim 1 further comprising the steps of:
   dynamically measuring signal strengths, in real-time, associated with one or more uplink electromagnetic signals transmitted by the remote stations;
   dynamically classifying each of the uplink electromagnetic signals into one of said channel groups based upon the measured signal strengths and the established boundaries such that each mobile station meets a particular range of measured signal strengths defined by the established boundaries.

9. A method for defining channel groups in a wireless system, the method comprising:
   measuring received signal strength data at a measurement location for electromagnetic transmissions transmitted by a plurality remote stations distributed throughout a radio frequency coverage area in a wireless system;
   determining a cumulative probability density function of the measured signal strength data for the remote stations;
   assigning a desired number of channel groups of communication channels for the remote stations; and
   establishing boundaries of each channel group to achieve an approximately equivalent quality of service for each channel group based on the cumulative probability density function.

10. The method according to claim 9 wherein the measuring step includes collecting a sufficient number of measurement samples to establish a database of signal strength measurements corresponding remote station identifiers, and corresponding time-stamps indicating the time of the electromagnet transmission.

11. The method according to claim 9 wherein the measuring step includes periodically updating the measured signal strength data by taking new measurements.

12. The method according to claim 9 wherein the measuring step comprises measuring received signal strength at a base station, centrally located within the radio frequency coverage area, as the measuring location.

13. The method according to claim 9 wherein the determining step is accomplished by first establishing a probability density function based on the measured signal strength data.

14. The method according to claim 13 wherein the determining step is accomplished by summing various probabilities associated with corresponding received signal strength in the probability density function based on the measured signal strength.

15. The method according to claim 9 wherein the establishing step comprises establishing the boundaries to achieve an approximately equal number of channels per channel group.

16. The method according to claim 9 wherein the establishing step comprises establishing boundaries to achieve an approximately equal blocking rate for access within the channels associated with each channel group.

17. The method according to claim 9 further comprising the steps of:
   measuring signal strengths associated with electromagnetic signals within different frequency spectrums;
   classifying each of the electromagnetic signals into one of said channel groups based upon the measured signal strength and the boundaries defined in terms of signal strengths; and
   allowing multiple channel groups to share a common circuit board at a common intermediate frequency derived from the electromagnetic signals if the multiple channel groups have commensurate characteristic signal strengths.

18. A receiver system comprising:
   a plurality of a signal strength measurers for measuring a signal strengths associated with electromagnetic signals transmitted from mobile stations operating within different frequency ranges;
   a group allocator for classifying each of the electromagnetic signals into a channel group based upon the measured signal strength and channel boundaries of the channel group defined in terms of probabilities based on the signal strengths; and
   a common circuit module for multiple allocated channel groups having a common intermediate frequency derived from the transmitted electromagnetic signals and having commensurate characteristic signal strengths.

19. The receiver system according to claim 18 wherein the common circuit module comprises a first signal branch and a second signal branch, the transmitted electromagnetic signals on the first branch and the second branch having an approximately equal range of signal strengths.

20. The receiver system according to claim 18 wherein the common circuit module comprises a first signal branch and a second signal branch, the transmitted electromagnetic signals on the first and second signal branches having approximately equal average signal strengths.

21. The receiver system according to claim 18 wherein the group allocator comprises a processing system including a look-up table containing channel group boundaries for channel groups, the channel group boundaries being expressed in terms of limits of signal strengths.

\* \* \* \* \*